US005944983A

United States Patent [19]

Hayashi et al.

[11] Patent Number: 5,944,983

[45] Date of Patent: Aug. 31, 1999

[54] HYDROTREATING CATALYST AND HYDROTREATING PROCESS OF HYDROCARBON OIL BY USING THE SAME

[75] Inventors: Fumitaka Hayashi, Tokyo; Akira Kamo, Saitama; Hiroshi Toshima, Saitama; Akira Saiai, Saitama, all of Japan

[73] Assignee: Tonen Corporation, Saitama, Japan

[21] Appl. No.: 09/067,214

[22] Filed: Apr. 28, 1998

[51] Int. Cl.[6] ............................ C10G 45/04; B01J 21/12

[52] U.S. Cl. .................................... 208/264; 208/216 PP; 208/254 H; 502/232; 502/235

[58] Field of Search ......................... 208/216 PP, 254 H, 208/264; 502/232, 235, 234; 585/260

[56] References Cited

U.S. PATENT DOCUMENTS

| | | | |
|---|---|---|---|
| 4,310,441 | 1/1982 | Alafandi et al. | 252/453 |
| 4,988,659 | 1/1991 | Pecoraro | 502/235 |

*Primary Examiner*—Bekir L. Yildirim

[57] ABSTRACT

This invention relates to a hydrotreating catalyst for a hydrocarbon oil and also to a process for hydrotreating the hydrocarbon oil by using the catalyst. More specifically, the present invention is concerned with a hydrotreating catalyst formed by having a hydrogenation-active component supported on a silica-alumina carrier and having a specific pore distribution and also with a hydrotreating process making use of the catalyst for the removal of sulfur compounds and nitrogen compounds from a hydrocarbon oil.

2 Claims, No Drawings

HYDROTREATING CATALYST AND HYDROTREATING PROCESS OF HYDROCARBON OIL BY USING THE SAME

REFERENCES TO RELATED APPLICATIONS

This application claims the priority of Japanese Patent Application No. HEI 09-126527 filed Apr. 30, 1997, which is incorporated herein by reference.

BACKGROUND OF THE INVENTION

1. Field of the Invention

This invention relates to a hydrotreating catalyst for a hydrocarbon oil and also to a process for hydrotreating the hydrocarbon oil by using the catalyst. More specifically, the present invention is concerned with a hydrotreating catalyst formed by having a hydrogenation-active component supported on a silica-alumina carrier and having a specific pore distribution and also with a hydrotreating process making use of the catalyst for the removal of sulfur compounds and nitrogen compounds from a hydrocarbon oil.

2. Background of the Invention

A variety of hydrotreating catalysts with oxides or sulfides of Group VI metals, Group VIII metals and the like of the Periodic Table supported on refractory inorganic oxides, such as alumina, silica-alumina, magnesia and zirconia, as carriers have been developed and widely used to date for the hydrotreatment of petroleum hydrocarbon oils. Such hydrotreating catalysts are used, for example, for the hydrodesulfurization, hydrodenitrogenation and hydrocracking of distillates and residual oils from atmospheric distillation or vacuum distillation processes, the hydrorefining of lubricant oil fractions, the hydrogenating isomerization of wax fractions, and the like. It has been increasingly recognized that the pores and pore distribution of a hydrotreating catalyst are important key factors for its activity and activity-maintenance ability in the hydrotreatment of various hydrocarbon oils. This recognition has therefore led to proposals such as a hydrotreating process making use of a catalyst, which has a pore distribution that the volume of pores having radii of 80 Å and greater is limited to 10% or less of its overall pore volume, in order to prevent asphalt and metal-containing compounds from penetrating from a feed oil into its pores (see JP Kokoku 45-38142) and a hydrotreating process making use of a catalyst, in which pores having radii of 120 Å and smaller are rather evenly distributed at intervals of 10 Å, in hydrodesulfurization of a residual oil (see JP Kokoku 4538143). In addition, a hydrodesulfurization catalyst for crude oil or topped crude is also disclosed, in which the volume of pores having diameters in a range of from 50 to 100 Å is controlled at least 50% of the overall pore volume of the catalyst and the volume of pores having diameter in a range of from 0 to 50 Å is controlled at most 25% of the overall pore volume of the catalyst (see JP Kokai 47-10356).

Further, the present applicant has also proposed a hydrotreating catalyst with a hydrogenation-active component such as molybdenum, cobalt or nickel supported on a silica-alumina carrier containing 2 to 40 wt. % of silica, in which the volume of pores having diameters of 300 Å and smaller is controlled to account for 80% or more of the overall pore volume of the catalyst and the pores are controlled to distribute over both categories of micropores and macropores (see JP Kokoku 5-39662).

However, with a view to meeting the demand for more stringent hydrodesulfurization from the viewpoint of environmental conservation, the development of hydrodesulfurization catalysts, each of which contains pores of relatively small diameters in an increased volume and thus has a high specific surface area, has been the subject of a great deal of conventional work with a primary objective focused on improvements in desulfurization activity. As a corollary to this, there is an outstanding need for further improvements in denitrogenation activity.

Hydrocarbon oils include those containing nitrogen compounds, for example, basic nitrogen compounds such as pyridines, amines and amides and weakly acidic nitrogen compounds such as pyrroles at high levels. If these hydrocarbon oils are used as fuel oils as are, they become a cause of air pollution. This is certainly not preferred from the standpoint of environmental conservation. Further, catalytic cracking or catalytic reforming of a hydrocarbon oil with nitrogen compounds contained therein involves a problem that the nitrogen compounds cause a significant reduction in the activity of a cracking catalyst or reforming catalyst and hence induce a reduction in the yield of a product. It has therefore been an important theme to achieve high-efficiency denitrogenation of a hydrocarbon oil.

Incidentally, the attainment of highly distributed support of an active metal component on a carrier requires an increase in the specific surface area of the carrier. An increase in the volume of pores of relatively large pores effective for an improvement in denitrogenation activity, however, results in a problem that the specific surface area is decreased. Under such development situations, the development of a hydrotreating catalyst of a high surface area, which is excellent in both desulfurization activity and denitrogenation activity, has been strongly desired.

With the foregoing development situations, the present invention has as primary objects thereof the novel developments of a hydrotreating catalyst having both high desulfurization activity and high denitrogenation activity and a hydrotreating process of a hydrocarbon oil by using the hydrotreating catalyst.

With a view to attaining the above-described objects of this invention, the present inventors have proceeded with extensive research. As a result, it has been found that a hydrotreating catalyst with the volume of pores of relatively small diameters retained at a certain level and also with pores of relatively large, specific diameters increased in volume can promote a hydrodenitrogenation reaction and such a hydrotreating catalyst can be produced by controlling conditions for the preparation of an aluminum hydrate as a raw material component. The present inventors have also been interested in a finding that use of the hydrotreating catalyst makes it possible to effectively eliminate both sulfur compounds and nitrogen compounds from a hydrocarbon oil. Based on these findings, the present invention has come to completion.

The present invention relates in a first aspect thereof to a hydrotreating catalyst composed of a carrier, which is formed of silica-alumina containing silica in a proportion of from 2 to 40 wt. % based on the whole weight of the carrier, and at least one hydrogenation-active metal component supported on the carrier, characterized in that:

(1) the volume of pores having diameters in a range of from 30 to 100 Å as measured by the nitrogen adsorption method accounts for 50 to 70% of the volume of pores having diameters in a range of from 0 to 150 Å as measured by the nitrogen adsorption method, and the volume of pores having diameters in a range of from 100 to 150 Å as measured by the nitrogen adsorption method accounts for 15 to 40% of the volume of pores having diameters in a range of from 0 to 300 Å as measured by the nitrogen adsorption method;

(2) the volume of the pores having the diameters in the range of from 0 to 300 Å as measured by the nitrogen adsorption method accounts for at least 70% of the volume of pores having diameters of 40 Å and greater as measured by the mercury porosimetry; and (3) the catalyst has a specific surface area of at least 200 m2/g.

The present invention also relates in a second aspect thereof to a process for the hydrotreatment of a hydrocarbon oil, characterized in that the hydrocarbon oil is brought into contact with hydrogen in the presence of the above-described hydrotreating catalyst.

DETAILED DESCRIPTION OF THE INVENTION

The present invention will hereinafter be described in detail. In the hydrotreating catalyst according to the present invention, the carrier is silica-alumina, which contains silica. Preferred as the silica-alumina is one having a structure that silica layers are formed on surfaces of alumina as a core. The silica component in the silica-alumina carrier is suited for the control of the solid acidity of the catalyst, and can provide the catalyst with strongly acidic sites and hence with increased cracking activity. The content of silica in the carrier may be in a range of from 2 to 40 wt. %, preferably from 5 to 35 wt. %, more preferably from 7 to 20 wt. % based on the whole weight of the carrier. A silica content in excess of 40 wt. % promotes cracking of a feed oil, resulting in a problem that the thus hydrotreated oil become lighter.

As the alumina component of the silica-alumina, any one of γ-alumina, χ-alumina and η-alumina or a mixture thereof is preferred. No particular limitation is imposed on the crystalline form of the alumina component insofar as it can provide the hydrotreating catalyst of the present invention with the above described specific pore distribution and characteristic values.

It is also possible to add, to the silica-alumina, another refractory inorganic oxide material, for example, one or more inorganic oxides selected from the group consisting of magnesia, calcium oxide, zirconia, titania, boria, hafnia, crystalline zeolite and the like. The content of the refractory inorganic oxide material may preferably be in a range of from 0.1 to 10 wt. % based on the total weight of the carrier. These refractory inorganic oxides, for example, magnesia can decrease strongly acidic sites of the silica-alumina and the like and, at the same time, can increase weakly acidic sites to improve the selectivity of the catalyst.

As a process for the preparation of a silica-alumina carrier usable as the carrier for the hydrotreating catalyst of the present invention, it is possible to adopt inter alia a process in which a silica gel and an alumina gel are prepared in advance and are then mixed together, a process in which a silica gel is immersed in a solution of an aluminum compound and a basic substance or acidic substance is added in an appropriate amount to make an alumina gel deposit on the silica gel, a process in which a basic substance or acidic substance is added to a uniformly mixed solution of a water-soluble aluminum compound and a water soluble silicon compound to co-precipitate them together. Adoption of the following process is however preferred to obtain a silica-alumina carrier having physical properties, such as pore distribution and characteristic values, required for the hydrotreating catalyst of the present invention. Namely, as a process for the preparation of a silica-alumina carrier for use in the hydrotreating catalyst according to the present invention, it is suited to form an alumina gel and then to make a silica gel deposit. A specific embodiment of the preparation process can be exemplified as will be described next.

To an aqueous solution which has been obtained by adding an acidic or alkaline aluminum compound to warm water of about 50 to about 80° C., an acid or an alkali hydroxide is gradually added to control the pH of the solution within a range of from about 7 to 11, preferably from 8 to 10 over a predetermined time, whereby an alumina gel is caused to precipitate. The thus-precipitated alumina gel is then allowed to age at the same temperature for 0.2 to 1.5 hours, to which an aqueous solution of an alkali silicate and, if necessary, a mineral acid solution are added to adjust the pH to a range of from about 7 to 11. The resulting mixture is then maintained at a temperature of from about 50 to about 80° C. for 0.2 hour, so that a silica gel is caused to deposit on the alumina gel.

More specifically, it is preferable to adopt a process which comprises gradually adding an acidic or alkaline aqueous solution to an aqueous solution of a raw material aluminum compound to adjust the pH of the resulting mixture to pH 8 to 10 over about 5 minutes to about 30 minutes, whereby an alumina gel is formed; and then adding an aqueous solution of a silicon compound as a raw material in a predetermined amount to the thus-obtained alumina gel while maintaining the pH at the above-set value, whereby silica layers are formed on the alumina gel as a core. The preparation of an alumina gel under such conditions makes it possible to obtain a carrier with its pore distribution controlled, and the addition of a silica gel to the alumina gel within the predetermined pH range makes it possible to form silica layers with good bonding between alumina and silica.

As a raw material for alumina, it is possible to use a water-soluble compound, for example, a water soluble acidic aluminum compound or a water-soluble alkaline aluminum compound. Specific usable examples can include the sulfate, chloride and nitrate of aluminum; alkali metal aluminates, aluminum alkoxides; and other inorganic and organic salts of aluminum. On the other hand, usable examples of the water-soluble silicon compound can include alkali metal silicates such as sodium silicate (preferably, $Na_2O$:$SiO_2$=1:2 to 1:4); tetraalkoxysilanes; and orthosilicate esters. These aluminum compounds and silicon compounds can be used in the form of aqueous solutions. No particular limitation is imposed on their concentrations, so that their concentrations can be determined as desired. Nonetheless, a range of about 0.1 to about 4 moles/l, is preferable as the concentration of a solution of an aluminum compound.

Subsequent to the completion of the above described deposition of the silica gel on the alumina gel, the precipitate is collected by filtration, washed with a solution of ammonium carbonate and water to remove its impurity ions. It is then subjected to treatments such as drying and calcination so that the precipitate is finished into an alumina-silica carrier in which alumina is formed as a core and silica is deposited on the core.

The drying can be conducted by heating the washed precipitate at room temperature to about 200° C. in the presence or absence of oxygen. The calcination can be carried out by heating the dried precipitate to a temperature in a range of from about 200 to about 800° C., preferably from about 600 to abut 700° C. in the presence of oxygen.

Usable Examples of the hydrogenation-active metal component supported on the carrier can include one or more metals selected from the group consisting of Group VI metals and Group VIII metals of the Periodic Table. The Periodic Table of the Elements referred to herein is the one published by Sargent-Welch Scientific Company, Catalog No. S-18806, Copyright 1980. Described specifically, one or more metals can be selected for use in the present invention from the group consisting of chromium, molybdenum and tungsten in Group VI and iron, cobalt, nickel, palladium, platinum, osmium, iridium, ruthenium, rhodium and the like in Group VIII. A combination of a Group VI metal and a Group VIII metal, for example, a combination of molybdenum-cobalt, molybdenum-nickel, tungsten-nickel, molybdenum-cobalt nickel, tungsten-cobalt-nickel, or molybdenum-tungsten cobalt-nickel is particularly preferred for the hydrodesulfurization and hydrodenitrogenation of a hydrocarbon oil. It is also possible to additionally use a Group VII metal of the Periodic Table, for example, manganese and a Group IV metal of the same Table, for example, tin, germanium, lead or the like in combination with these active metal components.

It is preferable to have these hydrogenation active metal components supported in the form of oxides and/or sulfides. The sulfides can be prepared by presulfurization of the catalyst as will be described subsequently herein.

The hydrogenation active metal component can be supported by an impregnation method wherein a carrier is immersed in a solution of a soluble salt of the metal component to introduce the metal component into the carrier, a precipitation method that upon preparation of a carrier, the metal component is caused to precipitate at the same time, or a like method. Any other method may also be used, but the impregnation method is preferred because it is easy in operation and is convenient for the stabilization and maintenance of physical properties of the catalyst. As an impregnating operation, the carrier is immersed in an impregnating solution at room temperature or higher, and is then held there under conditions required to achieve sufficient impregnation of the carrier with the desired component. The volume and temperature of the impregnating solution can be adjusted as desired so that the active metal component can be supported in a desired quantity. Further, the amount of the carrier to be immersed in the impregnating solution can be determined depending on how much active metal component is desired to be supported.

The supporting of the hydrogenation-active metal component on the carrier through impregnation can be carried out by any method such as a one-step impregnation method or a two-step impregnation method. Two or more metal components may be supported by preparing a mixed solution of the two or more metal components beforehand and then simultaneously impregnating the carrier with them from the mixed solution (one-step impregnation method). They can also be supported by separately preparing solutions of the two or more metal components and then to successively impregnating the carrier with the solutions (two-step impregnation method). In the preparation of the hydrotreating catalyst for use in the present invention, no particular limitation is imposed on such an impregnation method. Any impregnation method can be adopted as desired. For the hydrotreating catalyst according to the present invention, it is however preferred to have one or more metals, which are selected from the group consisting of Group VIII metals of the Periodic Table, supported on the above-described silica-alumina carrier (first step) and then to have one or more metals selected from the group consisting of Group VIB metals of the same Table (second step). Specifically, one or more metals are selected for use in the first step from the group consisting of iron, cobalt, nickel, palladium, platinum, osmium iridium, ruthenium and rhodium in Group VIII of the Periodic Table. Preferably, cobalt and nickel can be used either singly or in combination. For use in the second step, on the other hand, one or more metals are selected from the group consisting of chromium, molybdenum and tungsten in Group VIB of the Periodic Table. Preferably, molybdenum and tungsten can be used either singly or in combination. Further, a third metal from Group IV or Group VII of the Periodic Table can also optionally be added as described above.

Concerning the supported quantities of the hydrogenation-active metal components in Group VIII and Group VIB of the Periodic Table, they may be, as expressed in terms of an oxide, from 0.5 to 20 wt. %, preferably from 1 to 8 wt. %, more preferably from 2 to 5 wt. % in the case of a Group VII metal, and from 5 to 30 wt. %, preferably from 8 to 25 wt. %, more preferably from 15 to 20 wt. % in the case of a Group VIB metal, all based on the whole weight of the catalyst. A quantity of the Group VIII metal smaller than 0.5 wt. % cannot bring about any sufficient desulfurization and denitrogenation activities. On the other hand, a quantity of the Group VIII metal greater than 20 wt. % results in an increase in the metal component in a free form not bonded with the carrier and, accordingly, in the formation of a composite oxide inactive with the Group VIB metal. As a result, the dispersibility of the Group VIB metal is lowered, thereby developing a problem that the catalytic activities are lowered. On the other hand, a quantity of the Group VIB metal smaller than 5 wt. % is also unable to provide desulfurization and denitrogenation activities, while a quantity of the Group VII metal greater than 30 wt. % leads to a problem that the dispersibility of the metal component is lowered and, further, a problem that the cocatalyst effects of the Group VII metal are not exhibited. The hydrotreating catalyst according to the present invention can be in any shape, including cylindrical shapes, granular shapes, tablet shapes, and other shapes such as a quatrefoil in cross-section, and can be produced by a forming method such as extrusion or granulation. The preferable diameter of the shaped product may be in a range of from 0.5 to 3.0 mm.

The carrier impregnated with the hydrogenation active metal component is subjected, after separation of the impregnating solution, to water washing, drying and calcination. Drying and calcination conditions can be substantially the same as the above-described conditions for the carrier, but a range of from about 400 to about 550° C. is preferred as the calcination temperature.

The hydrotreating catalyst according to the present invention can be produced by adopting the above described methods, and is composed of a carrier, which is formed of silica-alumina containing silica in a proportion of from 2 to 40 wt. % based on the whole weight of the carrier, and at least one hydrogenation-active metal component supported on the carrier, and features that:

(1) the volume of pores having diameters in a range of from 30 to 100 Å as measured by the nitrogen adsorption method accounts for 50 to 70% of the volume of pores having diameters in a range of from 0 to 150 Å as measured by the nitrogen adsorption method, and the volume of pores having diameters in a range of from 100 to 150 Å as measured by the nitrogen adsorption method accounts for 15 to 40% of the volume of pores having diameters in a range of from 0 to 300 Å as measured by the nitrogen adsorption method;

(2) the volume of the pores having the diameters in the range of from 0 to 300 Å as measured by the nitrogen adsorption method accounts for at least 70% of the volume of pores having diameters of 40 Å and greater as measured by the mercury porosimetry; and (3) the catalyst has a specific surface area of at least 200 $m^2/g$. As preferred embodiments, the present invention can provide:

(I) a hydrotreating catalyst composed of a carrier, which is formed of silica-alumina having a structure with silica layers formed on surfaces of alumina as a core and containing silica in a proportion of from 2 to 40 wt. % based on the whole weight of the carrier, and at least one hydrogenation-active metal component supported on the carrier, characterized in that:

(1) the volume of pores having diameters in a range of from 30 to 100 Å as measured by the nitrogen adsorption method accounts for 50 to 70% of the volume of pores having diameters in a range of from 0 to 150 Å as measured by the nitrogen adsorption method, and the volume of pores having diameters in a range of from 100 to 150 Å as measured by the nitrogen adsorption method accounts for 15–40% of the volume of pores having diameters in a range of from 0 to 300 Å as measured by the nitrogen adsorption method, (2) the volume of the pores having the diameters in the range of from 0 to 300 Å as measured by the nitrogen adsorption method accounts for at least 80% of the volume of pores having diameters of 40 Å and greater as measured by the mercury porosimetry, (3) the pores having the diameters in the range of from 0 to 300 Å as measured by the nitrogen adsorption method have an average pore diameter of from 40 to 100 Å, (4) the volume of the pores having the diameters of 40 Å and greater as measured by the mercury porosimetry is from 0.4 to 0.65 ml/g, and (5) the catalyst has a specific surface area of at least 200 $m^2/g$; and (II) a hydrotreating catalyst composed of a carrier, which is formed of silica-alumina having a structure with silica layers formed on surfaces of alumina as a core and containing silica in a proportion of from 2 to 40 wt. % based on the whole weight of the carrier, and at least one hydrogenation-active metal component supported on the carrier, characterized in that:

(1) the volume of pores having diameters in a range of from 30 to 100 Å as measured by the nitrogen adsorption method accounts for 55 to 65% of the volume of pores having diameters in a range of from 0 o 150 Å as measured by the nitrogen adsorption method, and the volume of pores having diameters in a range of from 100 to 150 Å as measured by the nitrogen adsorption method accounts for 16 to 30% of the volume of pores having diameters in a range of from 0 to 300 Å as measured by the nitrogen adsorption method, (2) the volume of the pores having the diameters in the range of from 0 to 300 Å as measured by the nitrogen adsorption method accounts for at least 80% of the volume of pores having diameters of 40 Å and greater as measured by the mercury porosimetry, (3) the pores having the diameters in the range of from 0 to 300 Å as measured by the nitrogen adsorption method have an average pore diameter of from 65 to 95 Å, (4) the volume of the pores having the diameters of 40 Å and greater as measured by the mercury porosimetry is from 0.4 to 0.65 ml/g, and (5) the catalyst has a specific surface area of at least 200 $m^2/g$; and As a preferred embodiment of a hydrotreating process of a hydrocarbon oil, the present invention can also provide:

(III) a hydrotreating process of a hydrocarbon oil composed of a gas oil fraction as a principal component, characterized in that the hydrocarbon oil is brought into contact with hydrogen under hydrotreating conditions in the presence of the above-described hydrotreating catalyst.

One of the unique features of the hydrotreating catalyst according to the present invention resides in that the volume of pores having diameters in the range of from 30 to 100 Å as measured by the nitrogen adsorption method and the volume of pores having diameters in the range of from 100 to 150 Å as measured by the nitrogen adsorption method have been increased while maintaining a good balance there between. Representing the percentage of the total pore volume of the pores having the diameters of from 30 to 100 Å based on that of the pores having the diameters of from 0 to 150 Å [(30–100 Å)/(0–500 Å)] by X and the percentage of the total pore volume of the pores having the diameters of from 100 to 150 Å based on that of the pores having the diameters of from 0 to 300 Å [(100–150 Å)/(0–300 Å)] by Y, X ranges from 50 to 70%, preferably from 55 to 65%, while Y ranges from 15 to 40%, preferably from 16 to 30%.

If X is smaller than 50% or greater than 70% or if Y is smaller than 15% or greater than 40%, the desulfurization and denitrogenation activities are reduced. In particular, one having a Y/X ratio of from 0.15 to 0.6, especially from 0.25 to 0.45 is suited for the desulfurization and denitrogenation reaction.

The specific surface area of the hydrotreating catalyst according to the present invention is at least 200 $m^2/g$, preferably 220 $m^2/g$ or greater. A specific surface area of 200 $m^2/g$ or greater makes it possible to obtain the catalyst with the hydrogenation-active metal component supported in a well-distributed fashion on the carrier. In addition, the preferable volume of the pores having the diameters of from 0 to 300 Å in the hydrotreating catalyst according to the present invention may generally be at least 0.3 ml/g, notably from 0.4 to 0.6 ml/g as measured by the nitrogen adsorption method. A volume smaller than 0.3 ml/g makes it difficult to maintain the stable activity maintenance ability over a long time. Further, the volume of the pores having the diameters of from 30 to 100 Å may be at least 0.18 ml/g, with 0.2 ml/g or greater being preferred, and the volume of the pores having the diameters of from 100 to 150 Å may be 0.06 ml/g, with 0.08 to 0.18 ml/g being preferred. A hydrotreating catalyst obtained with such pores can exhibit both high desulfurization activity and high denitrogenation activity. Moreover, the volume of the pores having the diameters of 40 Å and greater as measured by the mercury impregnating method may be at least 0.4 ml/g, with 0.4 to 0.65 ml/g being preferred. This range is important for the maintenance of the activity-maintenance ability. If the volume of the pores exceeds 0.65 ml/g, the bulk density of the catalyst is lowered, resulting in a reduction in the packing density of the catalyst. This leads to a reduction in the effective quantity of the catalyst in a reactor, thereby failing to provide sufficient activities and involving a potential problem that the crush strength of the catalyst may be lowered.

A description will next be made about the hydrotreating process according to the present invention, which makes use of the hydrotreating catalyst of the present invention.

No particular limitation is imposed on the feed oil to be subjected to hydrotreatment, and distillates and residual oils from atmospheric and vacuum distillation processes, cracked gas oil fraction, and mixtures thereof are all usable. However, particularly preferred are vacuum gas oil fraction, cracked gas oil, straight run gas oil and the like, which are usually difficult to achieve desulfurization and denitrogenation at the same time. Vacuum gas oil is a distillate, which is obtained subjecting atmospheric residual oil to vacuum distillation and has a boiling point in a range of from about 370 to 610° C. It contains sulfur, nitrogen and metals at significant levels. Taking a vacuum gas oil of Arabian crude oil by way of example, it has a sulfur content of from about 2 to 4 wt. % and nitrogen content of from about 0.03 to 0.2 wt. %. In addition, it also has a Conradson carbon residue of about 1 wt. % or so. Cracked gas oil is a cracked oil, which is obtained by thermal cracking of a residual oil and has a boiling point of about 200° C. or higher. It is available, for example, from a coker, visbreaker or the like of a residual oil. In addition, light cycle gas oil (LCGO), heavy cycle gas oil (HCGO) and the like, which are available from catalytic cracking plants, can also be subjected to the hydrotreating process of the present invention. According to the hydrotreating process of the present invention, the above-described hydrodesulfurization and hydro-denitrogenation of vacuum gas oil can be conducted most effectively.

Reaction conditions for hydrotreatment can be suitably chosen in accordance with the kind of a feed oil and target values of desulfurization rate, denitrogenation rate and the like, although no particular limitations are imposed thereon. For example, the following conditions can be employed: reaction temperature, 280 to 420° C.; reaction pressure, 20 to 200 kg/cm$^3$; hydrogen-containing gas rate, 100 to 270 liter/liter, and liquid hourly space velocity, 0.5 to 4 V/H/V. As the hydrogen-containing gas, one having a hydrogen concentration in a range of from 60 to 100% can be used.

The hydrotreating catalyst according to the present invention can achieve high desulfurization and denitrogenation levels under severe reaction conditions that cause a relatively fast activity deterioration, especially even at a low reaction pressure.

Upon conducting the hydrotreatment of a hydrocarbon oil, the hydrotreating catalyst can be used in any one of fixed-bed, fluidized-bed and moving-bed reaction systems. Adoption of a fixed bed is however preferred from the apparatus or operation standpoint. Further, it is also possible to achieve high desulfurization and denitrogenation levels by conducting hydrotreatment in plural, that is, two or more reactors connected together.

It is preferable for the hydrotreating catalyst according to the present invention to conduct presulfurization prior to the hydrotreatment of a feed oil. As this presulfurization, a sulfur-containing distillate is fed to a reactor after the calcined catalyst is packed in the reactor. The sulfur-containing distillate is brought into contact with the catalyst under the following reaction conditions: temperature, 150 to 400° C.; pressure (total pressure), 20 to 100 kg/cm$^2$; liquid hourly space velocity, 0.3 to 2.0 V/H/V; and hydrogen-containing gas rate, 50 to 1,500 liter/liter, whereby the hydrogenation-active metal component is subjected to sulfurization. After completion of the presulfurization, a sulfur-containing distillate is returned as a feed oil to the same reactor. Operation conditions suitable for the desulfurization and denitrogenation of the feed oil are set, and a hydrotreating operation is started. As a method for conducting the pre-sulfurization, it is possible, besides such a method as described above, to directly bring hydrogen sulfide or another sulfur compound into contact with the catalyst or to add hydrogen sulfide or another sulfur compound to a suitable distillate and bring the thus-prepared distillate into contact with the catalyst.

EXAMPLES

The present invention will next be described more specifically by Examples and Comparative Examples. It should however be noted that the present invention is not limited by these Examples.

Incidentally, the specific surface area, pore volumes and the like each hydrotreating catalyst were measured by the following methods, and its average pore diameter was calculated as will be described below.

Specific surface area

Measured by the BET nitrogen adsorption isotherm.

Pore volumes

Measured by the nitrogen adsorption method or the mercury porosimetry.

The nitrogen adsorption method and the mercury porosimetry, which were employed as measuring methods of pore volumes, are described in P. H. Emmett, et al., "Catalysis", 1, 123, Reihold Publishing Co. (1959) and "Shokubai Kogaku Koza (Catalyst Engineering Series)", 4, 69–78, K.K. Chijin Shokan (1964).

For the nitrogen adsorption method, various correction methods have been proposed based on multimolecular layer adsorption. Of these, the BJH method [E. P. Barrett, L. G. Joyner and P. P. Halenda, J. Amer. Chem. Soc., 73, 373 (1951)] and the CI method [R. W. Canston and F. A. Inkley, "Advances in Catalysis", IX, 143, Academic Press, New York (1957)] are used in general. Data on pore volumes in the present invention were each obtained by using the adsorption side of a corresponding adsorption isothermal curve and performing a calculation in accordance with the BJH method.

In the mercury porosimetry, the contact angle and surface tension of mercury were set at 130° and 435 dyne/cm, respectively, and all pores were assumed to be cylindrical.

Each average pore diameter was calculated in accordance with the BJH method. It was calculated by the following calculation formula:

$$4V/A\times 10{,}000\ [\text{Å}]$$

where

V=volume of pores having diameters of 300 Å and smaller, [ml/g]; and

A=specific surface area as measured by the BET method, [m$^2$/g].

Example 1 (Catalyst A)

A catalyst A having the properties shown in Table 1 was produced as will be described next.

Deionized water (3 liters) was heated to 70° C., in which 205 g of sodium aluminate were dissolved to prepare an aqueous solution of sodium aluminate the pH of which was about 12.

While adding a solution of nitric acid to the aqueous solution of sodium aluminate, the resulting mixture was adjusted to a predetermined pH range of from 8.8 to 9.2 over about 15 minutes. The mixture was subsequently allowed to age at 70° C. for 0.5 hour, whereby an aqueous solution containing a precipitate (gel) of alumina hydrate was obtained.

To the aqueous solution, a solution of sodium silicate, which had been prepared by dissolving 69 g of No. 3 water glass in 200 g of deionized water, was added. The pH of the resulting mixture was adjusted to about 9 by adding a solution of nitric acid as needed. The resulting mixture was allowed to age at 70° C. for 0.5 hour. As a result, a slurry containing a precipitate (gel) of particulate alumina hydrate with a precipitate (gel) of silica hydrate deposited on surfaces of the particulate alumina was obtained.

The slurry was filtered, and the resultant filtered cake was washed with an aqueous solution of ammonium carbonate until the concentration of sodium in the filtrate became 5 ppm or lower.

The cake was kneaded within a kneader controlled at 80° C. while drying it until a moldable water content was reached. By an extruder, the thus-kneaded cake was then formed into cylindrical pellets of 1.5 mm in diameter. The pellets so formed were dried at 120° C. for 16 hours and were then calcined at 700° C. for 3 hours into a calcined carrier.

The carrier was impregnated with a solution of cobalt nitrate (cobalt solution) until the content of the cobalt solution reached 4 wt. % in terms of CoO. The carrier so impregnated was dried at 120° C. and then calcined at 450° C. The resulting carrier was then impregnated with an aqueous solution of ammonium paramolybdate (molybdenum solution) until the content of the molybdenum solution reached 16 wt. % in terms of $MoO_3$. The thus-impregnated carrier was dried at 120° C. and then calcined at 500° C., whereby the catalyst B was obtained. Physical properties, such as specific surface area and pore size distribution, and chemical composition of the catalyst A are presented in Table 1.

Example 2 (Catalyst B)

A carrier was obtained by the same production procedures as in Example 1 except that, upon preparation of the aqueous solution containing the precipitate (gel) of alumina hydrate, the time until the adjustment of the pH of the aqueous solution of sodium aluminate by the addition of the solution of nitric acid was changed to about 15 minutes and the pH was set at 9.2 to 9.6.

The carrier was impregnated with a solution of cobalt nitrate and nickel nitrate (cobalt and nickel solution) until the content of the cobalt and nickel solution reached 4 wt. % in terms of CoO and 1 wt. % in terms of NiO. The carrier so impregnated was dried at 120° C. and then calcined at 450° C. The resulting carrier was then impregnated with an aqueous solution of ammonium paramolybdate (molybdenum solution) until the content of the molybdenum solution reached 16.0 wt. % in $MoO_3$. The thus-impregnated carrier was dried and then calcined at 500° C., whereby the catalyst B was obtained. Physical properties and composition of the catalyst B are presented in terms of at 120° C. catalyst chemical Table 1.

Example 3 (Catalyst C)

A catalyst C was obtained by the same production procedures as in Example 1 except that, upon preparation of the aqueous solution containing the precipitate (gel) of alumina hydrate, the time until the adjustment of the pH of the aqueous solution of sodium aluminate by the addition of the solution of nitric acid was changed to about 10 minutes and the pH was set at 8.6 to 9.0. Physical properties and chemical composition of the catalyst C are presented in Table 1.

Example 4 (Catalyst D)

A carrier was obtained by the same production procedures as in Example 1 except that, upon preparation of the aqueous solution containing the precipitate (gel) of alumina hydrate, the time until the adjustment of the pH of the aqueous solution of sodium aluminate by the addition of the solution of nitric acid was changed to about 20 minutes and the pH was set at 9.2 to 9.4.

The carrier was impregnated with a solution of cobalt nitrate and nickel nitrate (cobalt and nickel solution) until the concept of the cobalt and nickel solution reached 4 wt. % in terms of CoO and 1 wt. % in terms of NiO. The carrier so impregnated was dried at 120° C. and then calcined at 450° C. The resulting carrier was then impregnated with an aqueous solution of ammonium paramolybdate (molybdenum solution) until the content of the molybdenum solution reached 16 wt. % in terms of $MoO_3$. The thus-impregnated carrier was dried at 120° C. and then calcined at 500° C., whereby the catalyst D was obtained. Physical properties and chemical composition of the catalyst D are presented in Table 1.

Example 5 (Catalyst E)

Deionized water (3 liters) was heated to 70° C., in which 220 g of sodium aluminate were dissolved to prepare an aqueous solution of sodium aluminate the pH of which was about 12.

To the thus-prepared aqueous solution, a solution of nitric acid was next added over about 25 minutes to adjust the pH to a predetermined pH range of from 8.2 to 8.6. The resulting mixture was subsequently allowed to age at 70° C. for 0.5 hour, whereby an aqueous solution containing a precipitate (gel) of alumina hydrate was obtained. To the aqueous solution, a solution of sodium silicate, which had been prepared by dissolving 49 g of No. 3 water glass in 200 g of purified water, was added. The pH of the resulting mixture was adjusted to about 9 by adding a solution of nitric acid as needed. The resulting mixture was allowed to age at 70° C. for 0.5 hour. As a result, a slurry containing a precipitated particles, which were composed of alumina hydrate and silica hydrate deposited on surfaces of the alumina hydrate, was obtained.

The carrier, which had been obtained by filtering the slurry and then washing, forming, drying and calcining the resultant cake in the same manner as in Example 1, was impregnated with a solution of cobalt nitrate and nickel nitrate (cobalt and nickel solution) until the content of the cobalt and nickel solution reached 4 wt. % in terms of CoO and 1 wt. % in terms of NiO. The carrier so impregnated was dried at 120° C. and then calcined at 450° C. The resulting carrier was then impregnated with an aqueous solution of ammonium paramolybdate (molybdenum solution) until the content of the molybdenum solution reached 16 wt. % in terms of $MoO_3$. The thus-impregnated carrier was dried at 120° C. and then calcined at 500° C., whereby the catalyst E was obtained. Physical properties and chemical composition of the catalyst E are presented in Table 1.

Comparative Example 1 (Catalyst F)

A commercially-available desulfurization catalyst was used. Its physical properties and chemical composition are presented in Table 1.

Comparative Example 2 (Catalyst G)

The catalyst G presented in Table 1 was obtained by similar production procedures as in Example 1 except that, upon preparation of the aqueous solution containing the precipitate (gel) of alumina hydrate, the time until the adjustment of the pH of the aqueous solution of sodium aluminate by the addition of the solution of nitric acid was changed to about 2 minutes and the pH was set at 9.6 to 9.8.

Comparative Example 3 (Catalyst H)

The catalyst H presented in Table 1 was obtained by similar production procedures as in Example 1 except that, upon preparation of the aqueous solution containing the precipitate (gel) of alumina hydrate, the time until the adjustment of the pH of the aqueous solution of sodium aluminate by the addition of the solution of nitric acid was changed to about 1 minutes and the pH was set at 10.0 to 10.4.

From the above Examples and Comparative Examples, it is evident that the catalysts A to E according to the present invention—in each of which the volume of pores having diameters of from 30 Å to 100 Å and the volume of pores having diameters of from 100 Å to 150 Å were both large, the pore distributions X and Y were well balanced, and the magnitude of Z was retained—are superior in both desulfurization rate and denitrogenation rate to the catalysts F, G, H in each of which the pore distribution ratio X/Y was biased or Z was insufficient.

TABLE 1

| Catalyst | A | B | C | D | E | F | G | H |
|---|---|---|---|---|---|---|---|---|
| $SiO_2$, wt. % | 14.2 | 14.9 | 150 | 14.8 | 11.2 | 8.2 | 15.3 | 13.5 |
| SA, $m^2/g$ | 260 | 251 | 240 | 255 | 263 | 290 | 259 | 210 |
| $PV_{N2}$(0–300 Å), ml/g | 0.51 | 0.55 | 0.46 | 0.48 | 0.47 | 0.47 | 0.59 | 0.46 |
| $PV_{N2}$(0–30 Å), ml/g | 0.02 | 0.03 | 0.03 | 0.03 | 0.03 | 0.03 | 0.02 | 0.02 |
| $PV_{N2}$(0–100 Å), ml/g | 0.25 | 0.24 | 0.25 | 0.24 | 0.26 | 0.38 | 0.21 | 0.17 |
| $PV_{N2}$(100–150 Å), ml/g | 0.13 | 0.13 | 0.11 | 0.12 | 0.10 | 0.05 | 0.21 | 0.11 |
| $PV_{N2}$(150–300 Å), ml/g | 0.11 | 0.18 | 0.10 | 0.12 | 0.11 | 0.04 | 0.17 | 0.18 |
| $PV_{Hg}$(>40 Å), ml/g | 0.55 | 0.60 | 0.53 | 0.57 | 0.55 | 0.49 | 0.64 | 0.70 |
| [$PV_{N2}$(30–100 Å)/$PV_{N2}$(0–150 Å)] × 100 (X), % | 60.5 | 56.8 | 61.1 | 58.3 | 63.9 | 81.4 | 45.2 | 53.6 |
| [$PV_{N2}$(100–150 Å)/$PV_{N2}$(0–300 Å)] × 100 (Y), % | 25.5 | 23.6 | 23.9 | 25.0 | 21.3 | 10.6 | 35.6 | 23.9 |
| $MoO_3$/CoO/NiO, wt. % | 16.0/4.0/0 | 15.8/4.4/1.1 | 16.1/4.0/0 | 16.0/4.0/1.2 | 16.0/3.8/1.2 | 16.2/4.3/1.4 | 16.0/4.0/0 | 15.9/4.1/0 |
| Y/X | 0.42 | 0.42 | 0.39 | 0.43 | 0.33 | 0.13 | 0.79 | 0.45 |
| PD(0–300 Å), Å | 78 | 88 | 77 | 78 | 71 | 65 | 81 | 88 |
| [$PV_{N2}$(0–300 Å)/$PV_{Hg}$(>40 Å)] × 100 (Z), % | 92.7 | 91.7 | 86.8 | 84.2 | 85.5 | 95.9 | 92.2 | 65.7 |

Note:
SA: Surface area
$PV_{N2}$: Pore volume by the nitrogen adsorption method
$PV_{Hg}$: Pore volume by the mercury porosimetry
PD(0–300 Å): Average pore diameter in a pore diameter range of from 0 to 300Å.

Example 6

Using the catalysts A to E, hydrotreatment of vacuum gas oil was conducted under the below-described hydrotreating conditions. Evaluation results of desulfurization and denitrogenation activities are presented in Table 2. Incidentally the sulfur levels of the thus-hydrotreated oils ranged from 0.05 to 1 wt. %, and their nitrogen levels ranged from 200 to 400 wt. ppm.

Feed oil: vacuum gas oil
- Density: 0.922 g/m/at 15° C.
- Sulfur content: 2.0 wt. %
- Nitrogen content: 800 wt. ppm Hydrotreating conditions:
- Reaction temperature: 370° C.
- Reaction pressure: 60 $kg/cm^2G$
- Hydrogen gas/feed oil ratio: 1,200 SCF/B
- Liquid hourly space velocity: 1.0 $hr^{-1}$ Comparative Example 4

Hydrotreatment was conducted in a similar manner as in Example 6 except that the catalysts F, G, H were used in place of the catalysts A to E. Evaluation results of desulfurization and denitrogenation activities are also presented in Table 2.

TABLE 2

| | Examples | | | | | Comparative Examples | | |
|---|---|---|---|---|---|---|---|---|
| Catalyst | A | B | C | D | E | F | G | H |
| Desulfruization Rate (%) | 102 | 104 | 108 | 106 | 118 | 100 | 84 | 79 |
| Denitrogenation Rate (%) | 120 | 135 | 124 | 132 | 120 | 100 | 90 | 82 |

In the hydrotreating catalyst according to the present invention, the pore volume ratio Y of pores having diameters of from 100 to 150 Å to pores having diameters of from 0 to 300 Å [(100 to 150 Å)/(0 to 300 Å)] is larger compared with those of the conventionally-known hydrotreating catalysts and is well balanced with the pore volume ratio X of pores having diameters of from 30 to 100 Å to pores having diameters of from 0 to 150 Å [(30 to 100 Å)/(0 to 150 Å)] and, moreover, the pore volume ratio 7 of pores having diameters of from 0 to 300 Å to pores having diameters of 40 Å and greater [(0 to 300 Å)/(40 Å and greater)] is large. These ratios are all sufficient. In the hydrodenitrogenation of vacuum gas oil or cracked gas oil containing a lot of nitrogen compounds which are poorly reactive and are hardly removable, the hydrotreating catalyst according to the present invention can achieve a high denitrogenation rate and, at the same time, can also attain a high desulfurization rate. Accordingly, the present invention can provide a gas oil fraction of ultimate high-quality as a fuel oil or as a raw material for catalytic cracking.

What is claimed is:

1. A hydrotreating catalyst composed of a carrier, which is formed of silica-alumina containing silica in a proportion of from 2 to 40 wt. % based on the whole weight of said carrier, and at least one hydrogenation-active metal component supported on said carrier, characterized in that:

(a) the volume of pores having diameters in a range of from 30 to 100 Å as measured by the nitrogen adsorption method accounts for 50 to 70% of the volume of pores having diameters in a range of from 0 to 150 Å as measured by the nitrogen adsorption method, and the volume of pores having diameters in a range of from 100 to 150 Å as measured by the nitrogen adsorption method accounts for 15 to 40% of the volume of pores having diameters in a range of from 0 to 300 Å as measured by the nitrogen adsorption method;

(b) the volume of the pores having the diameters in the range of from 0 to 300 Å as measured by the nitrogen adsorption method accounts for at least 70% of the volume of pores having diameters of 40 Å and greater as measured by the mercury porosimetry; and (c) said catalyst has a specific surface area of at least 200 m2/g.

2. A process for the hydrotreatment of a hydrocarbon oil, characterized in that said hydrocarbon oil is brought into contact with hydrogen in the presence of a hydrotreating catalyst according to claim 1.

* * * * *